US010657963B2

(12) United States Patent
Cha et al.

(10) Patent No.: US 10,657,963 B2
(45) Date of Patent: May 19, 2020

(54) METHOD AND SYSTEM FOR PROCESSING USER COMMAND TO PROVIDE AND ADJUST OPERATION OF ELECTRONIC DEVICE BY ANALYZING PRESENTATION OF USER SPEECH

(71) Applicants: NAVER Corporation, Seongnam-si (KR); LINE Corporation, Tokyo (JP)

(72) Inventors: Seijin Cha, Seongnam-si (KR); Eonjoung Choi, Seongnam-si (KR)

(73) Assignees: NAVER Corporation, Seongnam-si (KR); LINE Corporation, Tokyo (JP)

( * ) Notice: Subject to any disclaimer, the term of this patent is extended or adjusted under 35 U.S.C. 154(b) by 182 days.

(21) Appl. No.: 15/969,394

(22) Filed: May 2, 2018

(65) Prior Publication Data
US 2018/0322872 A1 Nov. 8, 2018

(30) Foreign Application Priority Data

May 2, 2017 (KR) .................... 10-2017-0056128

(51) Int. Cl.
*G10L 15/00* (2013.01)
*G10L 15/22* (2006.01)
(Continued)

(52) U.S. Cl.
CPC .............. *G10L 15/22* (2013.01); *G10L 25/63* (2013.01); *G10L 2015/088* (2013.01); *G10L 2015/223* (2013.01)

(58) Field of Classification Search
CPC ... G10L 15/22; G10L 2015/223; G10L 15/26; G10L 15/265; G10L 15/30; G10L 15/08;
(Continued)

(56) References Cited

U.S. PATENT DOCUMENTS 7,590,536 B2 * 9/2009 Bates .................... G10L 15/197
704/231
9,189,196 B2 * 11/2015 Doherty .................. G06F 3/167
(Continued)

FOREIGN PATENT DOCUMENTS

JP 19990119791 A 4/1999
JP 2009282936 A 12/2009
(Continued)

OTHER PUBLICATIONS

Japanese Office Action issued in corresponding Japanese patent application No. 2018-85215, dated Jun. 25, 2019.
(Continued)

*Primary Examiner* — Edgar X Guerra-Erazo
(74) *Attorney, Agent, or Firm* — Greer Burns & Crain Ltd.

(57) ABSTRACT

Provided is a user command processing method and system to provide and adjust an operation of a device by analyzing a presentation of a user speech. The user command processing method includes managing at least one pre-defined operation to be performed according to a user command, a plurality of options being preset in relation to each of the at least one pre-defined operation, receiving a user command at least including a voice input received from a user, selecting an operation corresponding to a keyword extracted from the voice input, determining at least one option corresponding to the extracted keyword among a plurality of options preset in relation to the selected operation, according to a presentation of the voice input, and performing the selected operation in association with the determined at least one option.

20 Claims, 9 Drawing Sheets

(51) Int. Cl.
*G10L 25/63* (2013.01)
*G10L 15/08* (2006.01)

(58) Field of Classification Search
CPC ....... G10L 15/00; G10L 17/005; G06F 3/167; G06F 3/0482; G06F 3/16
See application file for complete search history.

(56) References Cited

U.S. PATENT DOCUMENTS

| | | | |
|---|---|---|---|
| 2007/0216764 A1* | 9/2007 | Kwak | G07C 9/00309 348/14.06 |
| 2013/0311997 A1* | 11/2013 | Gruber | G06F 9/4843 718/102 |
| 2014/0100848 A1* | 4/2014 | Shaffer | G10L 15/22 704/240 |
| 2015/0170643 A1* | 6/2015 | Nicholson | G06F 21/32 704/254 |
| 2016/0125879 A1* | 5/2016 | Lovitt | G10L 17/10 704/275 |
| 2016/0248768 A1* | 8/2016 | McLaren | H04L 63/10 |
| 2016/0262017 A1* | 9/2016 | Lavee | G06F 21/31 |
| 2018/0074785 A1* | 3/2018 | Ohmura | G06F 3/167 |

FOREIGN PATENT DOCUMENTS

| | | | | |
|---|---|---|---|---|
| JP | 2011028460 A | | 2/2011 | |
| JP | 2017016683 A | | 1/2017 | |
| KR | 1020070106488 A | | 11/2007 | |
| KR | 1020110139797 A | | 12/2011 | |
| KR | 1020130125367 A | | 11/2013 | |
| KR | 1020160141595 A | | 12/2016 | |
| WO | WO 2015/196063 | * | 6/2014 | ............. G10L 15/28 |

OTHER PUBLICATIONS

Japanese Office Action dated Feb. 19, 2019 by the Japanese Patent Office in Japanese patent application No. 2018-85215.
Nikkei Communication No. 624 Nikkei Communications, Japan, Nikkei Business Publications, Inc. Nikkei Business Publications, Inc., Dec. 28, 2015 (with partial translation).
1) Takuhiro Ega, 1 hour delivery, all you can do, point doubling, omni channel . . . more convenient! You can get more! New way of buying convenience store × net mail order best service decision title Head-to-head: CVS vs E-commerce, Nikkei trendy No. 395, Nikkei Business Publications, Inc. Nikkei Business Publications, Inc., 20 Jun. 20 (with partial translation).

* cited by examiner

METHOD AND SYSTEM FOR PROCESSING USER COMMAND TO PROVIDE AND ADJUST OPERATION OF ELECTRONIC DEVICE BY ANALYZING PRESENTATION OF USER SPEECH

CROSS-REFERENCE TO RELATED APPLICATION(S)

This application claims priority under 35 U.S.C. § 119 to Korean Patent Application No. 10-2017-0056128 filed May 2, 2017, in the Korean Intellectual Property Office (KIPO), the entire contents of which are incorporated herein by reference.

BACKGROUND OF THE INVENTION

Field of the Invention

One or more example embodiments relate to a user command processing method and system to provide and adjust an operation of a device or a range of providing contents according to an analysis of a presentation of a user speech, a computer program stored in a computer-readable recording medium for causing a computer to execute the user command processing method in combination with the computer, and the recording medium.

Description of Related Art

An interface operating based on a voice such an artificial intelligence (AI) speaker of a home network service is unable to use visual information, and thus has difficulties in selecting one of various options or selecting one from a great deal of information. For example, Korean Patent Application Publication No. 10-2011-0139797 discloses technology related to a home media device and a home network system and method using the same. This technology provides a home network service using a second communication network such as Wireless-Fidelity (Wi-Fi), other than a mobile communication network in the home network service, and enables a user to control a plurality of in-house multimedia devices through a voice command without a separate button control. In such a home network service, an electronic device configured to receive an input of a voice command of a user may receive a voice input "Turn off the light" of the user. In this example, the electronic device analyzes the received voice input "Turn off the light" and considers turning off the power of a smart lighting device. However, if there are multiple smart lighting devices on a home network, the electronic device may confront a situation in which the electronic device needs to determine which smart lighting device is to be turned off. In the related art, it is difficult to select an option intended by the user from various options related to an operation selected according to a voice input using only the voice input of the user which was already input. Similarly, in providing information intended by the voice input of the user, it is difficult to select an option according to which a variety of related information is to be provided.

BRIEF SUMMARY OF THE INVENTION

One or more example embodiments provide a user command processing method and system that may determine an option according to a presentation of a voice input received from a user although the voice input does not include a direct keyword for determining an option, and perform a selected operation in association with the determined option, with respect to various options of a pre-defined operation of an electronic device capable of performing an operation according to a user command, a computer program stored in a non-transitory computer-readable recording medium for causing a computer to execute the user command processing method in combination with the computer, and the non-transitory recording medium.

One or more example embodiments provide a user command processing method and system that may determine an option by utilizing a social relationship between a user and a person associated with an operation selected according to a presentation of a voice input of the user, or an urgency of a user command and/or a user emotion analyzed based on at least one of a manner of speaking and a tone of the user obtained through the voice input, although the voice input does not include a direct keyword for determining an option, a computer program stored in a non-transitory computer-readable recording medium for causing a computer to execute the user command processing method in combination with the computer, and the non-transitory recording medium.

According to an aspect of at least one example embodiment, there is provided a user command processing method including managing at least one pre-defined operation to be performed according to a user command, a plurality of options being preset in relation to each of the at least one pre-defined operation, receiving a user command at least including a voice input received from a user, selecting an operation corresponding to a keyword extracted from the voice input, determining at least one option corresponding to the extracted keyword among a plurality of options preset in relation to the selected operation, according to a presentation of the voice input, and performing the selected operation in association with the determined at least one option According to an aspect of at least one example embodiment, there is provided a non-transitory computer-readable recording medium storing instructions that, when executed by a processor, cause the processor to perform the user command processing method.

According to an aspect of at least one example embodiment, there is provided a computer program stored in a non-transitory computer-readable recording medium for causing a computer to execute the user command processing method in combination with the computer.

According to an aspect of at least one example embodiment, there is provided a user command processing system including at least one processor implemented to execute computer-readable instructions, and the at least one processor may be configured to manage at least one pre-defined operation to be performed according to a user command, a plurality of options being preset in relation to each of the at least one pre-defined operation, receive a user command at least including a voice input received from a user, select an operation corresponding to a keyword extracted from the voice input, determine at least one option corresponding to the extracted keyword among a plurality of options preset in relation to the selected operation, according to a presentation of the voice input, and perform the selected operation in association with the determined at least one option.

According to some example embodiments, it is possible to determine an option according to a presentation of a voice input received from a user although the voice input does not include a direct keyword for determining an option, and perform a selected operation in association with the determined option, with respect to various options of a pre-defined operation of an electronic device capable of performing an operation according to a user command.

According to some example embodiments, it is possible to determine an option by utilizing a social relationship between a user and a person associated with an operation selected according to a presentation of a voice input of the user, or an urgency of a user command and/or a user emotion analyzed based on at least one of a manner of speaking and a tone of the user obtained through the voice input, although the voice input does not include a direct keyword for determining an option.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
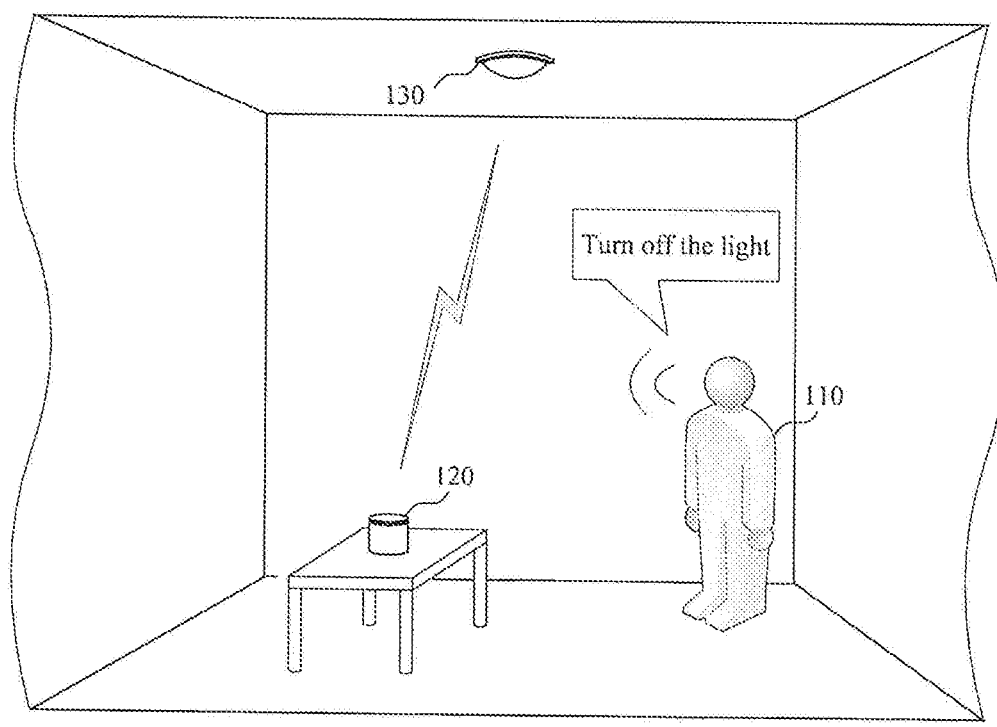
FIG. 1 is a diagram illustrating an example of a service environment utilizing a voice-based interface according to one embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random-access memory (RAM), read-only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one example embodiment will be described in detail with reference to the accompanying drawings.

A user command processing system according to at least one example embodiment may be implemented through an electronic device that provides an interface operating based on a voice. A user command may at least include a voice input received from a user, and the electronic device may process the user command by recognizing and analyzing the voice input directly or through an external platform connected through a separate interface connect such as an Application Programming Interface (API) call. A user command processing method according to at least one example embodiment may be performed through the electronic device. In this example, a computer program may be installed and run on the electronic device, and the electronic device may perform the user command processing method according to a control of the computer program. The above computer program may be stored in a computer-readable recording medium for causing a computer to execute the user command processing method in combination with the electronic device.

FIG. 1 is a diagram illustrating an example of a service environment utilizing a voice-based interface according to one embodiment. FIG. 1 illustrates an example in which an electronic device 120 providing an interface that operates based on a voice recognizes and analyzes a voice input "Turn off the light" received according to a speech of a user 110 and controls a light power of an in-house lighting device 130 linked to the electronic device 120 through an internal network in a house, in technology that connects and controls in-house devices, such as a smart home or a home network service.

For example, in-house devices may include various devices that may be connected and controlled online, for example, home appliances such as the in-house lighting device 130, a television, a personal computer (PC), peripheral equipment, an air conditioner, a refrigerator, and a robot cleaner, energy consuming devices such as water supply, electricity, and heating and cooling equipment, and security devices such as a door lock and a surveillance camera. In addition, the internal network may utilize wired network technology such as the Ethernet, home phoneline networking alliance (HomePNA), and the institute of electrical and electronics engineers (IEEE) 1394, or wireless network technology such as Bluetooth, ultra-wideband (UWB), Zig-Bee, Wireless 1394, and home radio frequency (HomeRF).

The electronic device 120 may be one of the in-house devices. For example, the electronic device 120 may be one of devices such as an artificial intelligence (AI) speaker or a robot cleaner provided in the house. Further, the electronic device 120 may be a mobile device of the user 110, for example, a smart phone, a mobile phone, a laptop computer, a digital broadcasting terminal, a personal digital assistant (PDA), a portable multimedia player (PMP), or a tablet PC. The electronic device 120 is not particularly limited thereto, and may include any type of device having a function to be connected to the in-house devices to receive a voice input of the user 110 and control the in-house devices.

Figure 2:
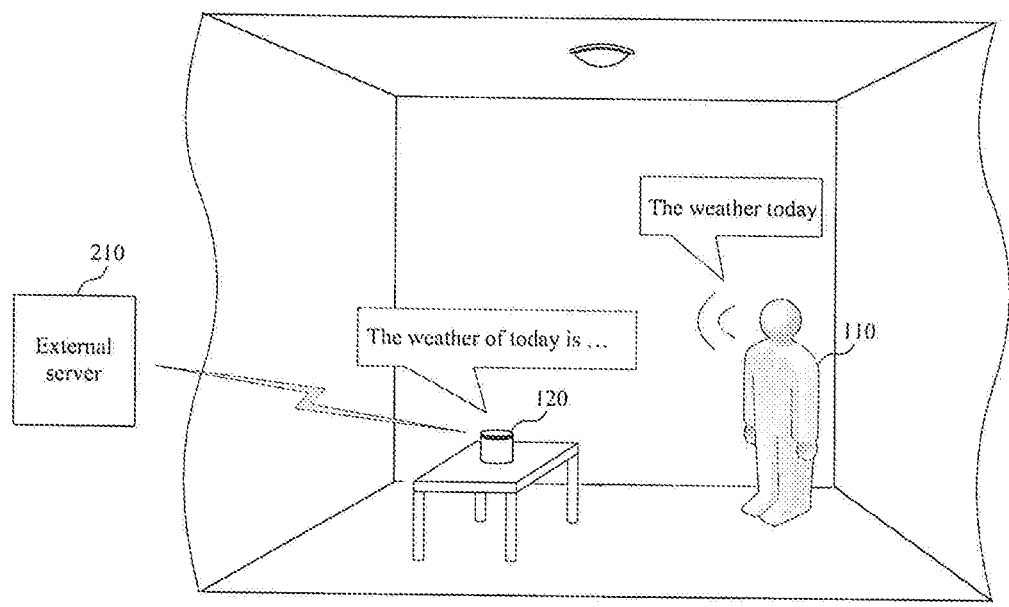
FIG. 2 is a diagram illustrating another example of a service environment utilizing a voice-based interface according to one embodiment.

FIG. 2 is a diagram illustrating another example of a service environment utilizing a voice-based interface according to one embodiment. FIG. 2 illustrates an example in which the electronic device 120 providing an interface that operates based on a voice recognizes and analyzes a voice input "The weather today" received according to a speech of the user 110, obtains information related to the weather for today from an external server 210 through an external network, and outputs the obtained information by voice.

For example, the external network may include at least one predetermined network among networks such as a personal area network (PAN), a local area network (LAN), a campus area network (CAN), a metropolitan area network (MAN), a wide area network (WAN), a broadband network (BBN), and the Internet.

In the example of FIG. 2, the electronic device 120 may be one of in-house devices or one of mobile devices of the user 110. The electronic device 120 is not particularly limited thereto, and may include any type of device having a function to receive and process a voice input of the user 110 and a function to access the external server 210 through the external network and provide the user 110 with contents or a service provided by the external server 210.

As described above, the electronic device 120 is not particularly limited, and may include any type of device that may process a user command at least including a voice input received according to a speech of the user 110 through the voice-based interface. For example, the electronic device 120 may process a user command by directly recognizing and analyzing a voice input of a user and performing an operation suitable for the voice input. However, the electronic device 120 may perform a process of recognizing the voice input of the user, analyzing the recognized voice input, and synthesizing a voice to be provided to the user through an external platform linked to the electronic device 120.

Figure 3:
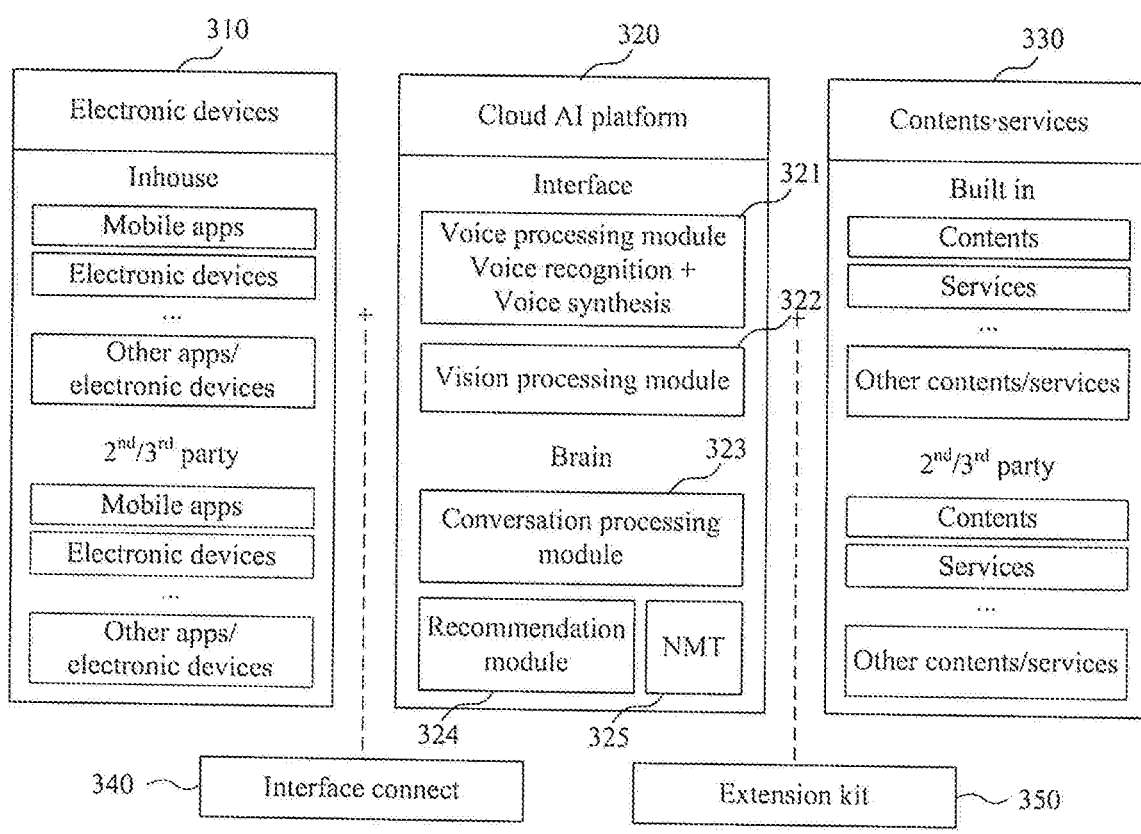
FIG. 3 is a diagram illustrating an example of a cloud artificial intelligence (AI) platform according to one embodiment.

FIG. 3 is a diagram illustrating an example of a cloud AI platform according to one embodiment. FIG. 3 illustrates electronic devices 310, a cloud AI platform 320, and "contents-services" 330.

According to the example embodiment, the electronic devices 310 may refer to devices provided in a house, and include at least the electronic device 120 described above. The electronic devices 310 or applications, hereinafter, apps, installed and run on the electronic devices 310 may be linked to the cloud AI platform 320 through an interface connect 340 such as an Application Programming Interface (API) call. Here, the interface connect 340 may provide developers with development documents and/or a software development kit (SDK) to be used to develop the electronic devices 310 or the apps installed and run on the electronic devices 310. Further, the interface connect 340 may provide an application program interface (API) by which the electronic devices 310 or the apps installed and run on the electronic devices 310 may utilize functions provided by the cloud AI platform 320. In detail, devices or apps developed by the developers using the development documents and/or the SDK provided by the interface connect 340 may utilize the functions provided by the cloud AI platform 320 using the API provided by the interface connect 340.

Here, the cloud AI platform 320 may provide a function to provide a voice-based service. For example, the cloud AI platform 320 may include various modules to provide the voice-based service, for example, a voice processing module 321 to recognize a received voice and synthesize a voice to be output, a vision processing module 322 to analyze and process a received image or video, a conversation processing module 323 to determine a suitable conversation to output an appropriate voice according to the received voice, a recommendation module 324 to recommend a function suitable for the received voice, and a neural machine translation (NMT) 325 to support an AI to translate a language in a unit of sentence through data learning.

For example, in the examples of FIGS. 1 and 2, the electronic device 120 may transmit the voice input of the user 110 to the cloud AI platform 320 using the API provided by the interface connect 340. In this example, the cloud AI platform 320 may recognize and analyze the received voice input by utilizing the modules 321 through 325 described above, and synthesize and provide a suitable answer voice according to the received voice input or recommend a suitable operation.

Further, an extension kit 350 may be a software development kit that enables third-party content developers or companies to implement a new voice-based function based on the cloud AI platform 320 and provides by provider of the cloud AI platform 320. For example, in the example of FIG. 2, the electronic device 120 may transmit the received voice input of the user 110 to the external server 210, and the external server 210 may transmit the voice input to the cloud AI platform 320 through an API provided through the extension kit 350. In this example, similar to the above description, the cloud AI platform 320 may synthesize and provide a suitable answer voice or provide the external server 210 with recommendation information related to a function to be processed through the voice input by recognizing and analyzing the received voice input. In the example of FIG. 2, the external server 210 may transmit the voice input "The weather today" to the cloud AI platform 320, and receive keywords "the weather" and "today" extracted through recognition of the voice input "The weather today" from the cloud AI platform 320. In this example, the external server 210 may generate textual information such as "The weather for today is . . . " through the keywords "the weather" and "today," and transmit the generated textual information back to the cloud AI platform 320. In this example, the cloud AI platform 320 may synthesize the textual information into a voice and provide the synthesized voice to the external server 210. The external server 210 may transmit the synthesized voice to the electronic device 120, and the electronic device 120 may output the synthesized voice "The weather for today is . . . " through a speaker, thereby processing the voice input "The weather today" received from the user 110.]

Figure 4:
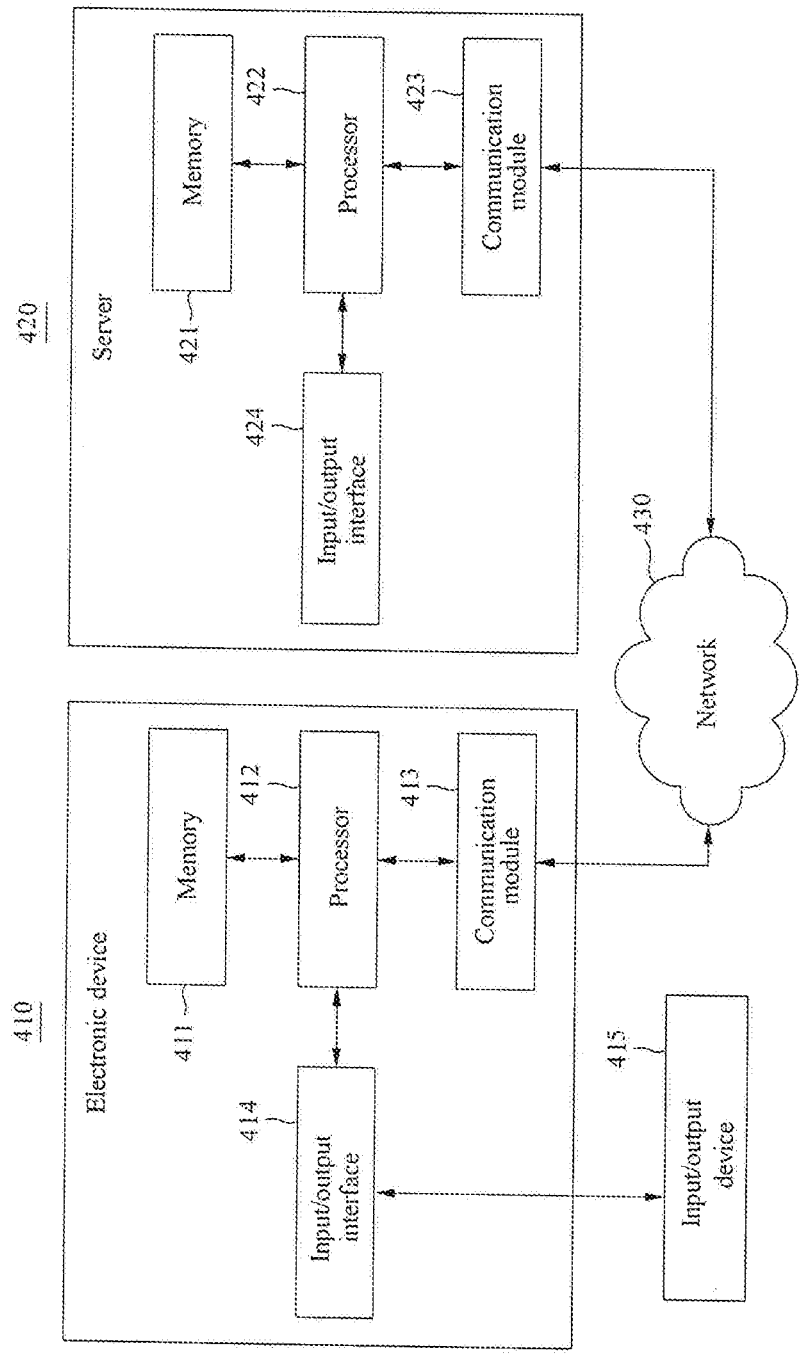
FIG. 4 is a block diagram to describe internal configurations of an electronic device and a server according to one embodiment.

FIG. 4 is a block diagram to describe internal configurations of an electronic device and a server according to one embodiment. An electronic device 410 of FIG. 4 may correspond to the electronic device 120 described above, and the server 420 may correspond to the external server 210 described above or a computer device that implements the cloud AI platform 320.

The electronic device 410 and the server 420 may include memories 411 and 421, processors 412 and 422, communication modules 413 and 423, and input/output interfaces 414 and 424, respectively. The memories 411 and 421 may be computer-readable recording media, and include permanent mass storage devices such as a random-access memory (RAM), a read-only memory (ROM), and a disk drive. Here, the permanent mass storage devices such as the ROM and the disk drive may be included in the electronic device 410 or the server 420 as separate permanent storage devices distinct from the memories 411 and 421. In addition, an operating system and at least one program code, for example, at least one code for an application installed and run on the electronic device 410 to provide a predetermined service, may be stored in the memories 411 and 421. Such software components may be loaded from computer-readable recording media separate from the memories 411 and 421. The separate computer-readable recording media may include computer-readable recording media such as a floppy drive, a disk, a tape, a DVD/CD-ROM drive, and a memory card. In another example, the software components may be loaded from the memories 411 and 421 through the communication modules 413 and 423, other than the computer-readable recording media. For example, at least one program may be loaded from the memory 411 of the electronic device 410 based on a computer program, for example, the application described above, installed by files provided by a file distribution system that distributes a setup file of an application or developers through a network 430.

The processors 412 and 422 may be configured to process instructions of the computer program by performing basic arithmetic, logical, and input/output operations. The instructions may be provided by the memories 411 and 421 or the communication modules 413 and 423 to the processors 412 and 422, respectively. For example, the processors 412 and 422 may be configured to execute instructions received according to program codes stored in recording devices such as the memories 411 and 421.

The communication modules 413 and 423 may provide a function for the electronic device 410 and the server 420 to communicate with each other through the network 430, and provide a function for the electronic device 410 and/or the server 420 to communicate with another electronic device or another server. According to an example embodiment, a request generated by the processor 412 of the electronic device 410 according to the program code stored in a recording device such as the memory 411 may be transmitted to the server 420 through the network 430 according to a control of the communication module 413. Also, a control signal, an instruction, contents, or a file provided according to a control of the processor 422 of the server 420 may be received by the electronic device 410 through the communication module 413 of the electronic device 410 via the communication module 423 and the network 430. For example, the control signal, the instruction, the contents, or the file of the server 420 received through the communication module 413 may be transmitted to the processor 412 or the memory 411, and the contents or the file may be stored in a storage medium, for example, the permanent storage device described above, that is further included in the electronic device 410.

The input/output interface 414 may be a means for interface with an input/output device 415. For example, an input device may include a device such as a microphone, a keyboard, or a mouse, and an output device may include a device such as a display or a speaker. In another example, the input/output interface 414 may be a means for interfacing with a device in which functions for an input and an output are unified, such as a touch screen. The input/output device 415 and the electronic device 410 may be configured as a single device. Further, the input/output interface 424 of the server 420 may be a means for interface with a device (not shown) for an input or an output, the device to be connected to the server 420 or included in the server 420.

In another example, the electronic device 410 and the server 420 may include fewer or more elements or components than the elements or components of FIG. 4. For example, the electronic device 410 may be implemented to include at least a portion of the input/output device 415 or may further include other elements such as a transceiver, a global positioning system (GPS) module, a camera, various sensors, and a database. In detail, if the electronic device 410 is a smart phone, the electronic device 410 may be implemented to further include various elements that a general smart phone includes, for example, an acceleration sensor or gyro sensor, a camera module, various physical buttons, buttons using a touch panel, input/output ports, and a vibrator for vibration.

Herein, the electronic device 410 may basically include a microphone to receive a voice input of a user as the input/output device 415, and may further include, as necessary, a speaker to output an answer voice corresponding to the voice input of the user or a sound such as audio contents as the input/output device 415.

A single operation to be performed by the electronic device 410 according to a user command may include a plurality of options according to the operation. For example, with respect to a voice input "Turn off the light" included in a user command, the electronic device 410 may perform an operation of turning off the power of a lighting device linked thereto. However, if a plurality of lighting devices is linked to the electronic device 410, there may be an option to determine which lighting device is to be turned off. The voice input of the user may directly include information to select the option, for example, "this room" of "Turn off the light in this room," or may simply include only information related to the operation. At least one example embodiment describes technologies for selecting such an option based on a presentation of an existing voice input, without receiving an additional voice input from the user.

Figure 5A:
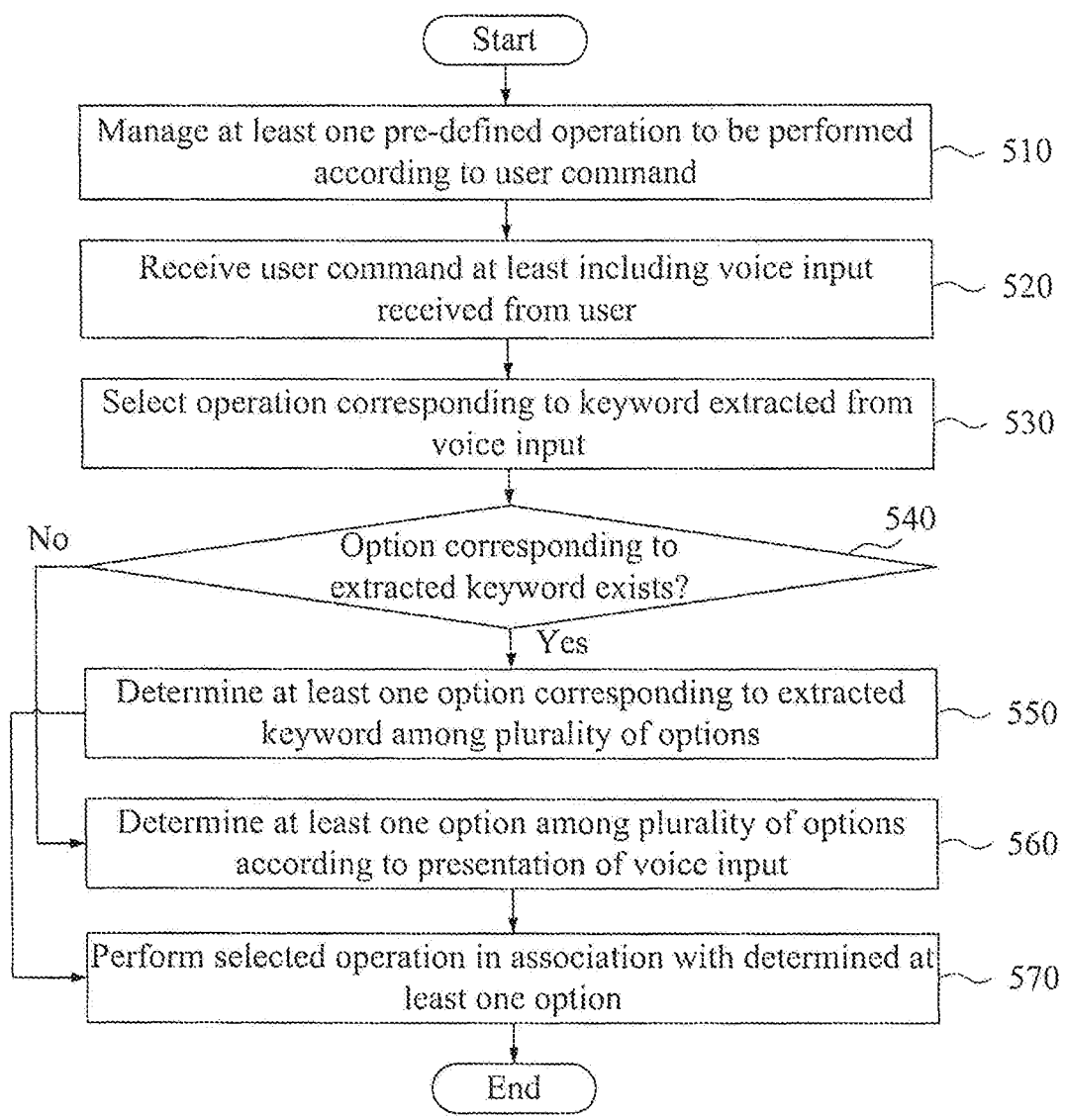
FIG. 5A is a flowchart illustrating an example of a user command processing method to be performed by an electronic device according to one embodiment.
Figure 5B:
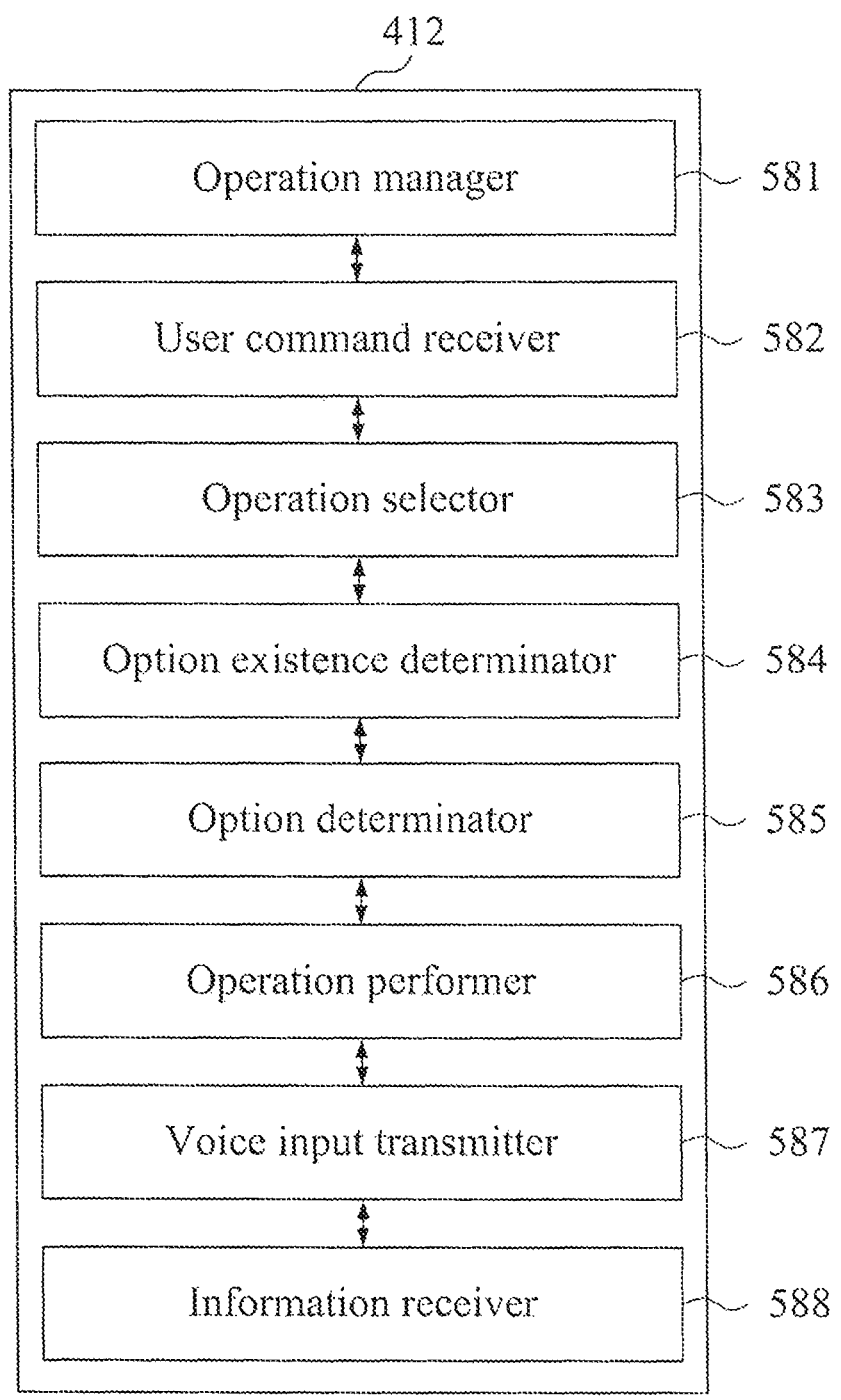
FIG. 5B is a block diagram illustrating an example of constituent elements included in at least one processor of the electronic device 410 according to one embodiment.

FIG. 5A is a flowchart illustrating an example of a user command processing method to be performed by an electronic device according to one embodiment, and FIG. 5B is a block diagram illustrating an example of constituent elements included in at least one processor of the electronic device 410 according to one embodiment. A user command processing system according to at least one example embodiment may be implemented in a form of a computer device such as the electronic device 410 described above. The electronic device 410 may perform operations 510 through 570 of the user command processing method of FIG. 5A. In this example, the processor 412 may be implemented to execute control instructions according to codes of an operating system or codes of at least one program included in the memory 411. Here, the processor 412 may control the electronic device 410 to perform operations 510 through 570 of FIG. 5A according to the control instructions provided by the codes stored in the electronic device 410. The constituent elements of the processor 412, such as an operation manager 581, a user command receiver 582, an operation selector 583, an option existence determinator 584, an option determinator 585, an operation performer 586, a voice input transmitter 587, and an information receiver 588 of FIG. 5B, may be representations of different functions performed at the processor 412.

In operation 510, the operation manager 581 may manage at least one pre-defined operation to be performed according to a user command. In this example, a plurality of options may be preset in relation to each of the at least one pre-defined operation. For example, options preset with respect to a single operation may include an option for selecting a device, for example, selecting a type of a device to be controlled according to the corresponding operation or selecting a predetermined device to be controlled according to the operation. In another example, the options preset with respect to the single operation may include an option for controlling a range of contents to be provided or a providing scheme such as a characteristic of the contents to be provided according to the operation or an order of providing the contents. Detailed examples of such options will be described further later.

In operation 520, the user command receiver 582 may receive a user command at least including a voice input received from a user. For example, as described above, the electronic device 410 may include a microphone as the input/output device 415, and the user command receiver 582 may receive the user command including the voice input of the user input through the microphone. For example, the electronic device 410 may include a camera, and receive an image input through the camera together with the voice input as the user command. Such image utilization will be described further later.

In operation 530, the operation selector 583 may select an operation corresponding to a keyword extracted from the voice input. For example, the operation selector 583 may obtain a character string corresponding to the voice input by analyzing the received voice input, and select a corresponding operation using a specific keyword by analyzing the obtained character string. As another example, the operation selector 583 may receive a keyword or select an operation corresponding to the keyword by means of an external platform such as the cloud AI platform 320 of FIG. 3. In detail, the operation selector 583 may transmit the voice input of the user to the cloud AI platform 320 through the interface connect 340, and select an operation suitable for the user command through a keyword or a recommended operation corresponding to the keyword provided by the cloud AI platform 320 by analyzing the voice input.

In operation 540, the option existence determinator 584 may determine whether at least one option corresponding to the extracted keyword exists among a plurality of options preset in related to the selected operation. For example, in relation to an operation of turning off a light power of a lighting device, if the electronic device 410 is connected to a plurality of lighting devices, an option for selecting a specific lighting device from among the plurality of lighting devices or all the lighting devices may be preset for the corresponding operation. In this example, the electronic device 410 may determine whether an option is selectable through the keyword extracted from the voice input of the user. In detail, the electronic device 410 may determine whether one of the plurality of lighting devices is selectable as at least one of a plurality of options preset with respect to an operation, like "the small bedroom" of "Turn off the light in the small bedroom" or "this room" of "Turn off the light in this room." As another example, with respect to an operation of sending an instant message, a person to which an instant message is to be sent may be determined through a selection of an option. In detail, with respect to the corresponding operation, different accounts registered in relation to an account of a user in a messenger service may be preset as the plurality of options in relation to the corresponding operation. Alternatively, phone numbers stored in a smart phone of the user or names stored with respect to the phone numbers may be preset as the plurality of options with respect to the corresponding operation. In this example, the electronic device 410 may determine whether a person to which an instant message is to be sent is selectable as at least one of the plurality of options preset with respect to the operation, like "daughter" of "Text my daughter to come home early" or "my mother" of "Text my mother to please come home early." In this example, the electronic device 410 may perform operation 550 when an option corresponding to the extracted keyword is present, and perform operation 560 when an option corresponding to the extracted keyword is absent.

In operation 550, the option determinator 585 may determine at least one option corresponding to the extracted keyword among the plurality of options. That is, the option determinator 585 may determine a corresponding operation and at least one of the options preset with respect to the operation using a keyword included in the voice input.

Also, there may be a case in which at least one of the options preset with respect to the operation is indeterminable through the keyword included in the voice input. For example, the voice input "Turn off the light" does not include a keyword regarding which lighting device is to be turned off, and the voice input "Text come home early" does not include a keyword regarding to whom the message is to be sent. In this example, in the related art, a selection of which lighting device or whom the message should be sent, needs to be received from the user. However, as already described above, the user may have more difficulties in selecting one of various options in a voice-based interface, when compared to selecting one of various options in a visual information-based interface. Accordingly, at least one example embodiment may provide a function to select an option according to a presentation of the voice input.

In operation 560, the option determinator 585 may determine at least one of the plurality options according to a presentation of the voice input. For example, the option determinator 585 may determine an option of the operation based on honorifics used in the voice input, how exploratory a speech of the user is, for example, an urgency level of the user command, or a user emotion analyzed based on a manner of speaking or a tone of the user.

According to an example embodiment, the presentation of the voice input may include an expression representing a social relationship between a person associated with the selected operation and the user. In this example, the option determinator 585 may determine at least one of the plurality of options based on the social relationship with the user which is analyzed according to the expression.

For example, the plurality of options may correspond to a plurality of devices interoperating with the electronic device 410. In this example, the electronic device 410 may determine, to be an option, at least one device associated with a person selected based on the social relationship with the user among the plurality of devices. In detail, when comparing a voice input "Turn off the light" and a voice input "Please turn off the light" ("please" used herein to carry a honorific connotation in Korean language), it may be verified that the latter voice input uses honorifics and a person associated with an operation of turning off the power to a lighting device has a higher social position than the user. In this example, the electronic device 410 may verify that a request of the user is for a person in a higher social position than the user according to a presentation of the latter voice input "Please turn off the light," and select an option based on the social relationship. For example, in the above example, the electronic device 410 may automatically select a lighting device positioned in a room of a person having a higher social status than the user, for example, a parent, rather than requesting the user to select the lighting device. Further, the electronic device 410 may automatically select a lighting device in a room where the user is currently present with respect to the voice input "Turn off the light."

According to another example embodiment, the plurality of options may correspond to messenger accounts or phone numbers of other users having a personal relationship with the user. In this example, the electronic device 410 may determine, to be an option, a messenger account or phone number of another user selected based on the social relationship with the user among the messenger accounts or phone numbers. In detail, with respect to a voice input of "Text come home early," the electronic device 410 may verify that a recipient of the message is a person who lives together with the user and has a lower social status than the user, for example, a child, through a presentation of the voice input. In this example, the electronic device 410 may automatically determine the recipient of the message to be a "daughter" or "son" of the user, rather than requesting the user to determine the recipient. In this example, the electronic device 410 may perform an operation of recommending the recipient to the user, such as "Do you want to send the message to your daughter?" and send a text message saying "come home early" to the "daughter" of the user using a phone number or messenger account of the "daughter" according to a confirmation input of the user. With respect to another voice input "Text please come home early," the electronic device 410 may verify that a recipient of the message is a person who lives together with the user and has a higher social status than the user, for example, a parent, through a presentation of the voice input. In this example, the electronic device 410 may automatically determine the "mother" or the "father" of the user to be the recipient of the message based on such a social relationship, and perform an operation of recommending the recipient of the message to the user, such as "Do you want to send the message to your mother?" In this example, the electronic device 410 may send a text message saying "please come home early" to the "mother" of the user using the phone number or the messenger account of the "mother" according to the confirmation input of the user. For this, the electronic device 410 may preset options with respect to an operation of sending a text based on information related to the social relationship of the user.

According to another example embodiment, the presentation of the voice input may include at least one of an urgency of a user command and a user emotion analyzed based on at least one of a manner of speaking and the tone of the user obtained through the voice input. In this example, the electronic device 410 may determine at least one option among the plurality of options based on at least one of the urgency of the user command and the user emotion.

For example, the plurality of options may correspond to characteristic classifications of contents to be associated with the selected operation or schemes of providing information related to the contents. In this example, the electronic device 410 may determine at least one classification among the characteristic classifications of the contents to be associated with the selected operation or determine at least one scheme among the schemes of providing information related to the contents based on at least one of the urgency of the user command and the user emotion. In detail, with respect to a search, a voice input "Find me a good restaurant" and a voice input "Would you find me a good restaurant?" may each have a different urgency of a user command according to the presentation of the voice input. The electronic device 410 may preset an urgency level according to the presentation of a voice input, such as a manner of speaking and a tone of the user, like "Find me" and "Would you find me?" and determine a characteristic of contents to be provided or a providing scheme to be the option according to the urgency level. For example, if a voice input is determined to have a relatively high urgency level, like the voice input "Find me a good restaurant," the electronic device 410 may provide the user with high-accuracy search results including restaurants close to the user and reflecting a taste of the user. As another example, if a voice input is determined to have a relatively low urgency level, like the voice input "Would you find me a good restaurant?", the electronic device 410 may provide the user with search results reflecting a taste of the user irrespective of a distance or various search results such as restaurants that recently attract a public interest. In detail, the priority of the distance between the user and a restaurant included in a search result may be determined to be the option with respect to the operation in relation to the search.

According to another example embodiment, a characteristic of contents or a providing scheme may be selected as the option based on an emotion of the user analyzed through the manner of speaking or the tone of the user. For example, if the user is in a bad mood, the electronic device 410 may first provide the user with information related to a match won by a sports team that the user supports, among information related to the corresponding sports team. As another example, if the user feels good, the electronic device 410 may sequentially provide the user with the latest information related to the sports team that the user supports. That is, the electronic device 410 may select the characteristic of the contents to be provided or the providing scheme as the option with respect to an operation of providing contents according to the emotion of the user.

According to another example, the electronic device 410 may determine at least one option among the plurality of options by further utilizing situation data of the user. For example, the situation data may include at least one of an instant message sent and received in association with a phone number or messenger account of the user and a facial expression of the user recognized through a camera included in the electronic device 410. In detail, instant messages recently sent and received by the user, for example, within the last one hour, may be utilized to accurately measure the emotion of the user described above. As another example, the facial expression of the user recognized through the camera may be utilized to accurately measure the emotion of the user or the urgency of the user command.

In operation 570, the operation performer 586 may perform the selected operation in association with the determined at least one option. As already described above, the operation performer 586 may perform an operation of recommending a recipient selected as the option or sending a message to the selected recipient. Also, the electronic device 410 may provide the user with the contents according to the characteristic of the contents and/or the providing scheme selected as the option.

As described above, according to one or more example embodiments, even if a voice input of a user does not include a specific keyword for selecting an option of an operation, the option may be automatically selected according to a presentation of the voice input of the user and the corresponding operation may be performed, without requesting the user to additionally select the option.

Figure 6:
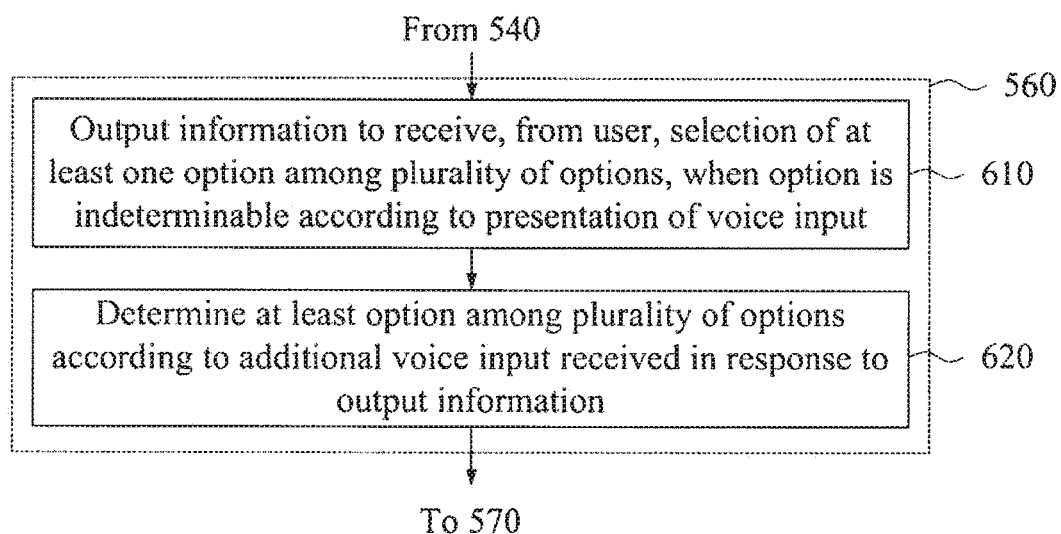
FIG. 6 is a flowchart illustrating an example of a user command processing method in a case in which an option is indeterminable according to a presentation of a voice input according to one embodiment.

FIG. 6 is a flowchart illustrating an example of a user command processing method in a case in which an option is indeterminable according to a presentation of a voice input according to one embodiment. Operations 610 and 620 of FIG. 6 may be performed by being included in operation 560 of FIG. 5A.

In operation 610, if an option is indeterminable according to a presentation of a voice input, the option determinator 585 may output information to receive, from a user, a selection of at least one option among a plurality of options. That is, the option determinator 585 may attempt to automatically determine the option through the presentation of the voice input, and then request the user to additionally select the option if the option is indeterminable through the presentation. For example, if a recipient of a message is indeterminable through only the presentation of the voice input, the option determinator 585 may output information to request the user to select the recipient, like "To whom do you want to send the message?"

In operation 620, the option determinator 585 may determine at least one option among the plurality of options according to an additional voice input received in response to the output information. For example, when an additional voice input of "my mother" is received from the user after outputting a voice saying "To whom do you want to send the message?", the recipient of the message may be determined based on the additional voice input.

Figure 7:
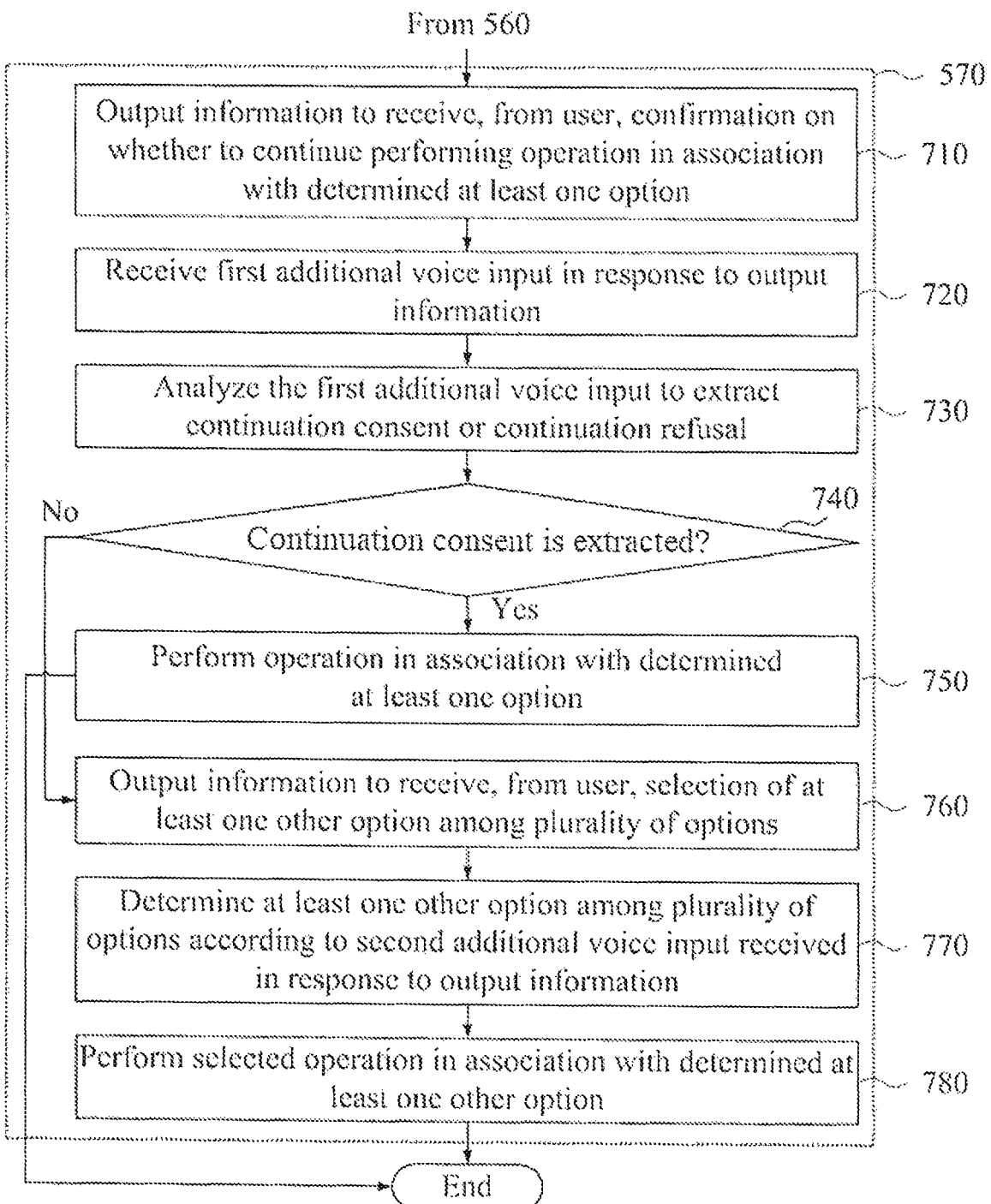
FIG. 7 is a flowchart illustrating an example of a user command processing method for recommending an automatically selected option or receiving a confirmation thereof according to one embodiment.

FIG. 7 is a flowchart illustrating an example of a user command processing method for recommending an automatically selected option or receiving a confirmation thereof according to one embodiment. Operations 710 through 780 of FIG. 7 may be performed by being included in operation 570 of FIG. 5A.

In operation 710, the operation performer 586 may output information to receive, from a user, a confirmation on whether to continue performing an operation in association with a determined at least one option. The output information may be utilized to receive, from the user, a confirmation on whether the determined option is suitable, or to recommend the determined option to the user. For example, in the example described above, "Do you want to send the message to your daughter?" may be output to receive, from the user, a confirmation on whether the recipient "daughter" determined to be the option is suitable and/or to recommend the recipient "daughter" determined to be the option to the user.

In operation 720, the operation performer 586 may receive a first additional voice input in response to the output information. The first additional voice input may be received as an answer for continuation consent or continuation refusal of the user with respect to the output information for confirmation and/or recommendation.

In operation 730, the operation performer 586 may analyze the first additional voice input to extract the continuation consent or the continuation refusal.

In operation 740, the operation performer 586 may determine whether the continuation consent is extracted. In this example, the operation performer 586 may perform operation 750 when an answer for continuation consent is extracted, and perform operation 760, 770, and 780 when an answer for continuation refusal is extracted.

In operation 750, the operation performer 586 may output information to receive, from the user, a selection of at least one other option among the plurality of options when an answer for continuation refusal is extracted from the first additional voice input. That is, the operation performer 586 may request the user to select another option when the user shows a negative response to the information output for confirmation and/or recommendation. For example, when an answer for continuation refusal, like "No," is extracted with respect to "Do you want to send the message to your daughter?" although the "daughter" is recommended as the recipient, the operation performer 586 may request the user to select another option.

In operation 760, the operation performer 586 may determine at least one other option among the plurality of options according to a second additional voice input received in response to the output information. Depending on example embodiments, the user may select another option while providing the answer for continuation refusal. For example, the user may simultaneously provide the answer for continuation refusal and a selection of another option, like "No, send it to my son," with respect to the output information "Do you want to send the message to your daughter?" In this example, operation 750 may be omitted, and the operation performer 586 may determine another option from the first additional voice input, in operation 760.

In operation 770, the operation performer 586 may perform the selected operation in association with the determined at least one option.

Figure 8:
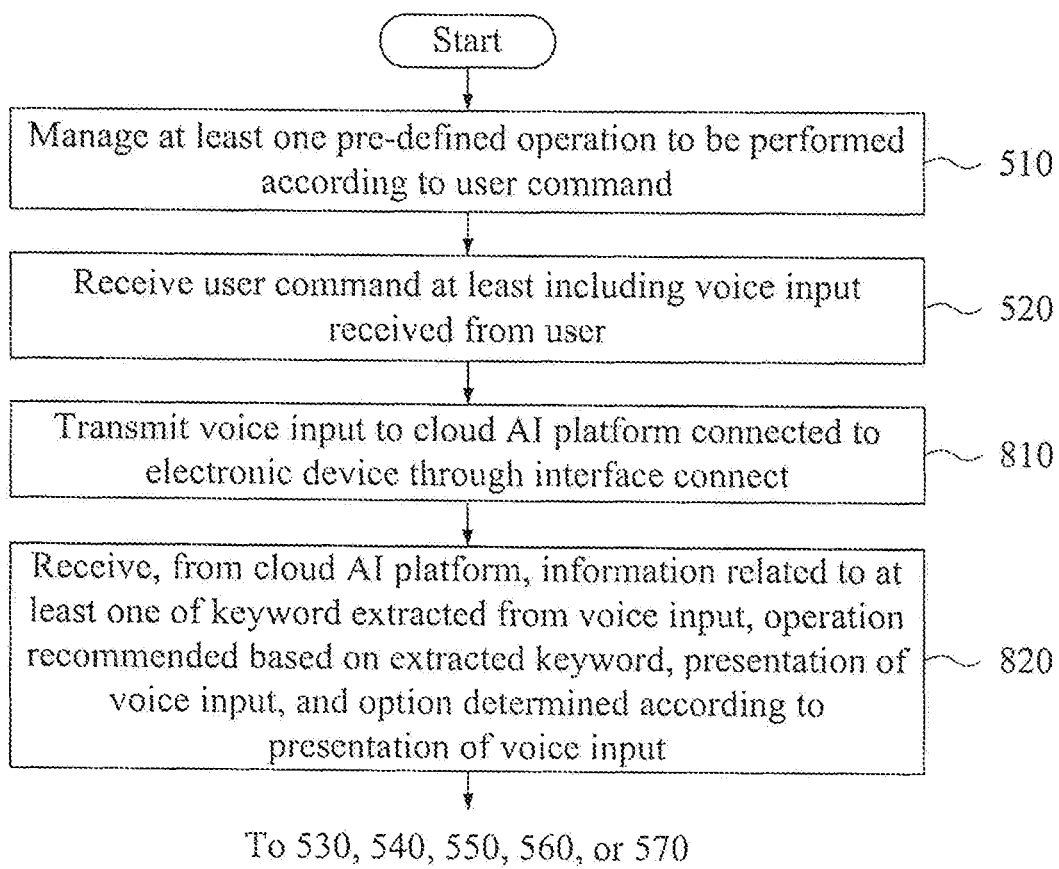
FIG. 8 is a flowchart illustrating an example of a user command processing method in a case of utilizing an external platform according to one embodiment.

FIG. 8 is a flowchart illustrating an example of a user command processing method in a case of utilizing an external platform according to one embodiment. Operations 810 and 820 of FIG. 8 may be performed after operation 520 of FIG. 5A, and an operation following operation 820 may be connected to one of operations 530 through 570 of FIG. 5A according to information received in operation 820.

In operation 810, the voice input transmitter 587 of FIG. 5B may transmit a voice input to a cloud AI platform connected to the electronic device 410 through an interface connect. In the example of FIG. 3, a case in which an external platform provides a voice-based service related to processing the voice input, synthesizing an answer voice, and/or processing a conversation was described. A voice input of a user received for processing the voice input according to the voice-based service may be transmitted to the cloud AI platform.

In operation 820, the information receiver 588 of FIG. 5B may receive, from the cloud AI platform, information related to at least one of a keyword extracted from the voice input, an operation recommended based on the extracted keyword, an option corresponding to the extracted keyword, and an option determined according to a presentation of the voice input.

According to an example embodiment, the cloud AI platform may recognize and analyze the voice input, extract a keyword therefrom, and transmit the extracted keyword to the electronic device 410. In this example, the electronic device 410 may perform the selected operation in association with the determined option, by performing operations of FIG. 5A, sequentially from operation 530 of FIG. 5A.

According to another example embodiment, the cloud AI platform may recognize and analyze the voice input, extract a keyword therefrom, and recommend an operation based on the extracted keyword. In this example, the electronic device 410 may perform the selected operation in association with the determined option, by performing operations of FIG. 5A, sequentially from operation 540 of FIG. 5A based on the recommended operation.

According to another example embodiment, the cloud AI platform may recognize and analyze the voice input, extract a keyword therefrom, select an operation based on the extracted keyword, determine an option corresponding to the extracted keyword, and provide the selected operation and the determined option to the electronic device 410. In this example, in operation 550, the electronic device 410 may determine the option provided from the cloud AI platform to be at least one option with respect to the selected operation. Further, the electronic device 410 may perform the selected operation in association with the determined option through operation 570.

According to another example embodiment, the cloud AI platform may recognize and analyze the voice input, extract a keyword, select an operation based on the extracted keyword, and determine an option according to a presentation of the voice input when an option corresponding to the extracted keyword is absent. In this example, the cloud AI platform may provide the selected operation and the determined option to the electronic device 410. In this example, the electronic device 410 may determine the option provided from the cloud AI platform to be at least one option with respect to the selected operation in operation 560 of FIG. 5A, and perform the selected operation in association with the determined option through operation 570.

As described above, the cloud AI platform may provide the voice-based service to the electronic device 410, and the voice-based service may include a different function according to at least one example embodiment.

As described above, according to some example embodiments, it is possible to determine an option according to a presentation of a voice input received from a user although the voice input does not include a direct keyword for determining an option, and perform a selected operation in association with the determined option, with respect to various options of a pre-defined operation of an electronic device capable of performing an operation according to a user command. Further, it is possible to determine an option by utilizing a social relationship between a user and a person associated with an operation selected according to a presentation of a voice input of the user, or an urgency of a user command and/or a user emotion analyzed based on at least one of a manner of speaking and a tone of the user obtained through the voice input, although the voice input does not include a direct keyword for determining an option.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable recording medium storing instructions that, when executed by a processor of an electronic device, cause the processor to perform a user command processing method comprising:

managing at least one pre-defined operation to be performed according to a user command and a plurality of options preset in relation to each of the at least one pre-defined operation for modifying a corresponding pre-defined operation, wherein the corresponding pre-defined operation modified by one of the plurality of options performs a different operation than the corresponding pre-defined operation modified by another of the plurality of options;

receiving the user command including at least a voice input received from a user;

selecting an operation from the at least one pre-defined operation corresponding to a keyword extracted from the voice input;

determining at least one option according to a presentation of the voice input; and
performing the selected operation as modified by the determined at least one option.

2. The non-transitory computer-readable recording medium of claim 1, wherein the determining of the at least one option comprises:
outputting information to receive, from the user, a selection of at least one option among the plurality of options, when the at least one option is indeterminable according to the presentation of the voice input; and
determining the at least one option among the plurality of options according to an additional voice input received in response to the output information.

3. The non-transitory computer-readable recording medium of claim 1, wherein the performing of the selected operation comprises:
outputting information to receive, from the user, a confirmation on whether to continue performing the selected operation as modified by the determined at least one option;
receiving a first additional voice input in response to the output information; and
performing the selected operation as modified by the determined at least one option, when an answer for continuation consent is extracted from the first additional voice input.

4. The non-transitory computer-readable recording medium of claim 3, wherein the performing of the selected operation comprises:
outputting information to receive, from the user, a selection of at least one other option among the plurality of options, when an answer for continuation refusal is extracted from the first additional voice input;
determining at least one other option among the plurality of options according to a second additional voice input received in response to the output information; and
performing the selected operation as modified by the determined at least one other option.

5. The non-transitory computer-readable recording medium of claim 1, wherein the presentation of the voice input includes an expression representing a social relationship between a person associated with the selected operation and the user, and
the determining of the at least one option comprises determining from among the plurality of options based on the social relationship with the user which is analyzed according to the expression.

6. The non-transitory computer-readable recording medium of claim 5, wherein the plurality of options corresponds to a plurality of devices interoperating with the electronic device,
the determining of the at least one option comprises determining at least one device associated with a person selected based on the social relationship with the user among the plurality of devices, and
the performing of the selected operation comprises performing the selected operation in association with the determined at least one device.

7. The non-transitory computer-readable recording medium of claim 5, wherein the plurality of options corresponds to messenger accounts or phone numbers of other users having a personal relationship with the user,
the determining of the at least one option comprises determining a messenger account or phone number of another user selected based on the personal relationship with the user among the messenger accounts or phone numbers, and
the performing of the selected operation comprises performing the selected operation in association with the determined messenger account or phone number.

8. The non-transitory computer-readable recording medium of claim 1, wherein the presentation of the voice input includes at least one of an urgency of a user command and a user emotion analyzed based on at least one of a manner of speaking and a tone of the user obtained through the voice input, and
the determining of the at least one option comprises determining from among the plurality of options based on at least one of the urgency of the user command and the user emotion.

9. The non-transitory computer-readable recording medium of claim 8, wherein the plurality of options corresponds to characteristic classifications of contents to be associated with the selected operation or schemes of providing information related to the contents,
the determining of the at least one option comprises determining at least one classification among the characteristic classifications of the contents to be associated with the selected operation or determining at least one scheme among the schemes of providing information related to the contents based on at least one of the urgency of the user command and the user emotion, and
the performing of the selected operation comprises performing the selected operation in associated with the contents according to the determined at least one classification or the determined at least one scheme.

10. The non-transitory computer-readable recording medium of claim 1, wherein the determining of the at least one option comprises determining the at least one option among the plurality of options by further utilizing situation data of the user, and
the situation data includes at least one of an instant message sent and received in association with a phone number of the user or a messenger account of the user and a facial expression of the user recognized through a camera included in the electronic device.

11. The non-transitory computer-readable recording medium of claim 1, wherein the electronic device includes an artificial intelligence (AI) speaker configured to control devices included in a smart home by interoperating with the devices or provide contents according to the user command through the Internet.

12. The non-transitory computer-readable recording medium of claim 1, wherein the user command processing method further comprises:
transmitting the voice input to a cloud AI platform connected to the electronic device through an interface connect; and
receiving, from the cloud AI platform, information related to at least one of the keyword extracted from the voice input, an operation recommended based on the extracted keyword, the option corresponding to the extracted keyword, and the option determined according to the presentation of the voice input.

13. A user command processing method, comprising:
managing at least one pre-defined operation to be performed according to a user command and a plurality of options preset in relation to each of the at least one pre-defined operation for modifying a corresponding pre-defined operation, wherein the corresponding pre-defined operation modified by one of the plurality of options performs a different operation than the corresponding pre-defined operation modified by another of the plurality of options;

receiving the user command including at least a voice input received from a user;

selecting an operation from the at least one pre-defined operation corresponding to a keyword extracted from the voice input;

determining at least one option according to a presentation of the voice input; and performing the selected operation as modified by the determined at least one option.

14. The user command processing method of claim 13, wherein the presentation of the voice input includes an expression representing a social relationship between a person associated with the selected operation and the user, and the determining of the at least one option comprises determining from among the plurality of options based on the social relationship with the user which is analyzed according to the expression.

15. The user command processing method of claim 14, wherein the plurality of options corresponds to a plurality of devices interoperating with an electronic device, the determining of the at least one option comprises determining at least one device associated with a person selected based on the social relationship with the user among the plurality of devices, and the performing of the selected operation comprises performing the selected operation in association with the determined at least one device.

16. The user command processing method of claim 13, wherein the presentation of the voice input includes at least one of an urgency of a user command and a user emotion analyzed based on at least one of a manner of speaking and a tone of the user obtained through the voice input, and the determining of the at least one option comprises determining from among the plurality of options based on at least one of the urgency of the user command and the user emotion.

17. The user command processing method of claim 16, wherein the plurality of options corresponds to characteristic classifications of contents to be associated with the selected operation or schemes of providing information related to the contents, the determining of the at least one option comprises determining at least one classification among the characteristic classifications of the contents to be associated with the selected operation or determining at least one scheme among the schemes of providing information related to the contents based on at least one of the urgency of the user command and the user emotion, and the performing of the selected operation comprises performing the selected operation in associated with the contents according to the determined at least one classification or the determined at least one scheme.

18. A user command processing system, comprising:

at least one processor implemented to execute computer-readable instructions, wherein the at least one processor is configured to:

manage at least one pre-defined operation to be performed according to a user command and a plurality of options preset in relation to each of the at least one pre-defined operation for modifying a corresponding pre-defined operation, wherein the corresponding pre-defined operation modified by one of the plurality of options performs a different operation than the corresponding pre-defined operation modified by another of the plurality of options, receive the user command including at least a voice input received from a user, select an operation from the at least one pre-defined operation corresponding to a keyword extracted from the voice input, determine at least one option according to a presentation of the voice input, and perform the selected operation as modified by the determined at least one option.

19. The user command processing system of claim 18, wherein the presentation of the voice input includes an expression representing a social relationship between a person associated with the selected operation and the user, and the at least one processor is configured to determine the at least one option among the plurality of options based on the social relationship with the user which is analyzed according to the expression.

20. The user command processing system of claim 18, wherein the presentation of the voice input includes at least one of an urgency of a user command and a user emotion analyzed based on at least one of a manner of speaking and a tone of the user obtained through the voice input, and the at least one processor is configured to determine the at least one option among the plurality of options based on at least one of the urgency of the user command and the user emotion.

* * * * *